United States Patent [19]

Mori

[11] Patent Number: 5,402,045
[45] Date of Patent: Mar. 28, 1995

[54] MOTOR DRIVE HAVING INVERTOR

[75] Inventor: Shushin Mori, Nagoya, Japan

[73] Assignee: Brother Kogyo Kabushiki Kaisha, Nagoya, Japan

[21] Appl. No.: 27,760

[22] Filed: Mar. 8, 1993

[30] Foreign Application Priority Data

Mar. 6, 1992 [JP] Japan ................... 4-049350

[51] Int. Cl.⁶ ............................................ H02P 3/18
[52] U.S. Cl. ..................... 318/757; 318/254; 318/376; 318/811; 318/762
[58] Field of Search ............ 318/700, 721, 722, 723, 318/724, 254, 138, 439, 375, 376, 379, 757, 759, 760, 761, 762, 807, 810, 811; 363/34, 37, 39, 40, 41

[56] References Cited

U.S. PATENT DOCUMENTS

| 4,368,411 | 1/1983 | Kidd | 318/599 X |
|---|---|---|---|
| 4,511,827 | 4/1985 | Morinaga et al. | 318/254 |
| 4,528,486 | 7/1985 | Flaig et al. | 318/254 |
| 4,544,868 | 10/1985 | Murty | 318/254 |
| 4,558,264 | 12/1985 | Weischedel | 318/254 |
| 4,782,272 | 11/1988 | Buckley et al. | 318/254 |
| 4,787,021 | 11/1988 | Hokari et al. | 318/376 X |
| 5,015,927 | 5/1991 | Reichard | 318/139 |
| 5,119,000 | 6/1992 | Schultz | 318/254 |
| 5,142,208 | 8/1992 | Curran et al. | 318/254 |
| 5,151,637 | 9/1992 | Takada et al. | 318/376 |
| 5,256,949 | 10/1993 | Reichard et al. | 318/254 |

FOREIGN PATENT DOCUMENTS

| 0069469 | 1/1983 | European Pat. Off. |
| 3438034 | 4/1986 | Germany |
| 4-26495 | 1/1992 | Japan |

Primary Examiner—Bentsu Ro
Attorney, Agent, or Firm—Oliff & Berridge

[57] ABSTRACT

A motor drive includes an invertor (5) with which a motor (6) is rotated at a variable speed. To suppress noises caused by ripple components contained in currents flowing in phase coils of the motor, the invertor (5) is controlled so as to direct a commuting current flowing from the phase coils to a d.c. power source (1) and at a time when the motor is decelerating to circulate in a path including the phase coils and the switching transistors of the invertor (5). This control is performed when the commuting currents fall below a predetermined level.

19 Claims, 10 Drawing Sheets

MOTOR DRIVE HAVING INVERTOR

BACKGROUND OF THE INVENTION

1. Field of the Invention

The present invention relates to a motor drive, and more particularly to the motor drive having an invertor for driving a motor at variable speeds.

2. Description of the Related Art

There has been known for a multi-phase coil motor, a conventional motor drive which uses regenerative braking to decelerate the speed of the motor. The motor drive includes a d.c. power source and an invertor. The d.c. power source includes a converter and a smoothing circuit. Commercial AC power is passed through the d.c. power source and converted to d.c. power therein. The resultant d.c. power is passed through the invertor where it is inversely converted to variable frequency a.c. power, which is then used to energize the different phase coils of the motor. To slow the motor, the motor drive reduces the frequency outputted from the invertor while rendering each phase coil ON and OFF in correspondence to the subsequent decrease in speed of the motor. At times when a phase coil is rendered OFF, the current for the phase coil is diverted back to the d.c. power supply, thereby generating a regenerative current which is applied for regenerative braking.

There has been known a problem in that a great deal of noise is generated when the motor is decelerating, because the current flowing to each phase coil includes a large ripple component, for example, about 3 A against a peak value 12.5 A as shown in FIG. 1.

Two methods have been introduced to reduce this noise. In the first method a reactor is inserted in series between the invertor and each phase coil to absorb the ripple component and improve the waveform. However there has been known a problem with this first method in that the large dimensions of the reactor require increasing housing space for the motor drive. For example, a three-phase motor requires three large reactors. Such a motor drive is inappropriate for equipment and devices where compact size is paramount, or which have no surplus housing space.

In the second method, a high-speed switching element (for example, an isolation gate bipolar transistor known as IGBT) is used in the invertor to increase the switching frequency (carrier frequency). However, such high-speed switching elements are expensive, which increases the overall cost of the motor drive.

SUMMARY OF THE INVENTION

It is, therefore, an object of the present invention to overcome the above-described drawbacks.

This and other objects of the present invention will be attained by providing a motor drive for driving a motor at a variable speed wherein the motor has a rotor and a plurality of phase coils. The motor drive includes a d.c. power source for supplying a d.c. power and an invertor for receiving the d.c. power from the d.c. power source and converting the d.c. power to variable frequency a.c. power. The variable frequency a.c. power is supplied to the plurality of phase coils of the motor. There is provided commuting means connected between the d.c. power source and the plurality of phase coils for allowing commuting currents to flow back to the d.c. power source from the plurality of coils when the rotor is decelerating. Control means is provided which controls the invertor so that the rotor rotates at the variable speed with the variable frequency a.c. power supplied by the invertor to the plurality of phase coils. The control means further controls the invertor so that the commuting currents circulate as flywheel currents between the invertor and the plurality of phase coils when the commuting currents fall below a predetermined level.

There are provided a detecting means for detecting currents flowing in the plurality of phase coils and determining means for determining that the currents flowing in the plurality of phase coils fall below the predetermined level. The control means controls the invertor based on determination made by the determining means.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
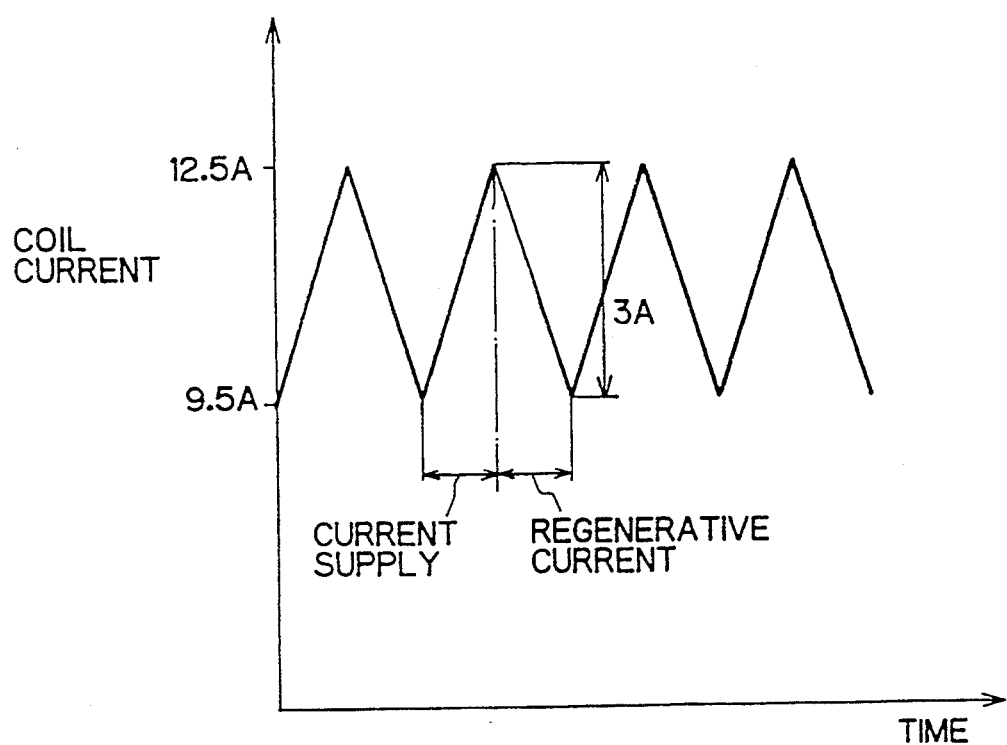
FIG. 1 is a graphical representation showing a ripple component of a coil current flowing at a time of deceleration according to a prior art.
Figure 2:
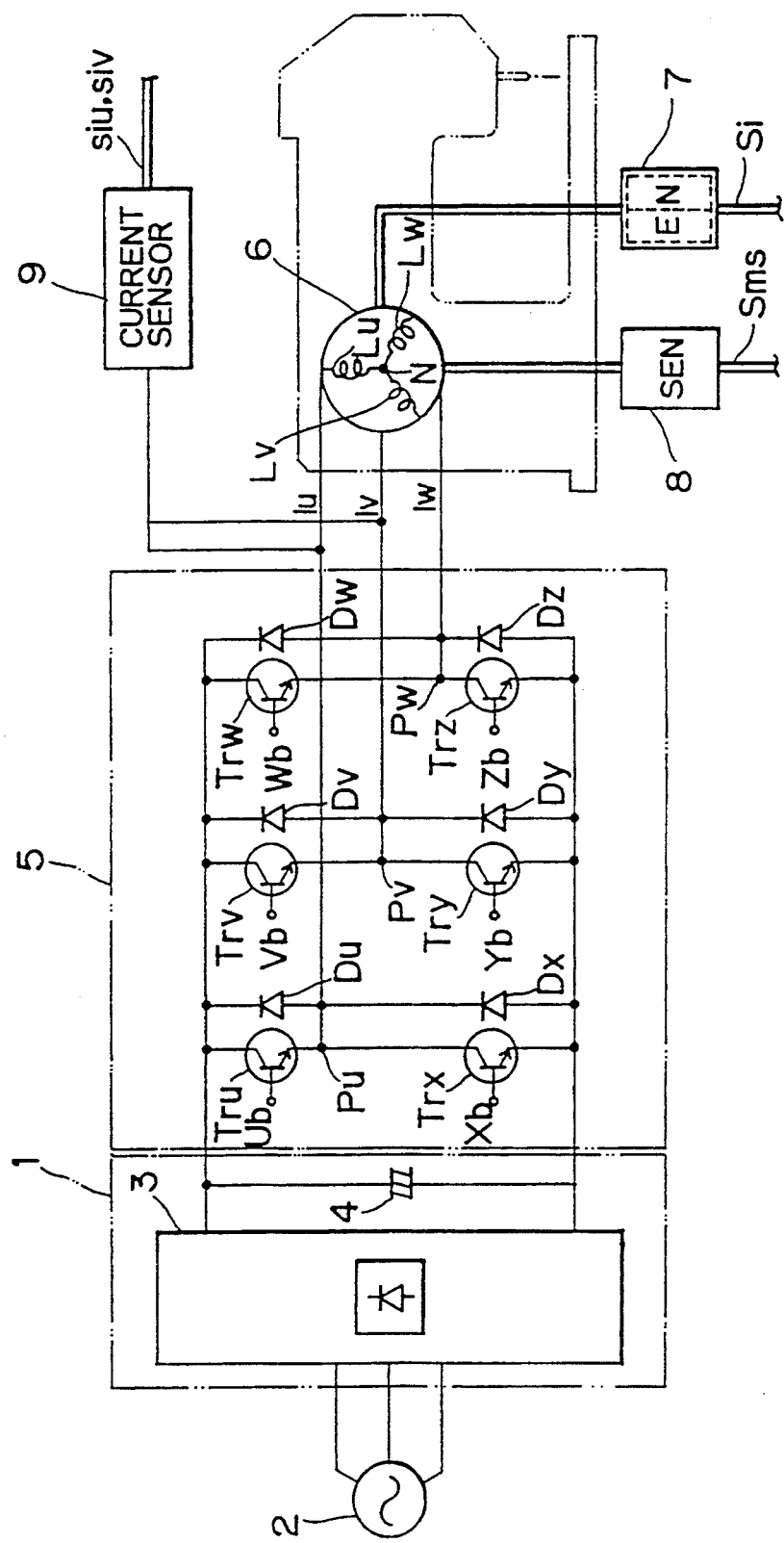
FIG. 2 is an electric circuit diagram showing an invertor according to an embodiment of the present invention.
Figure 3:
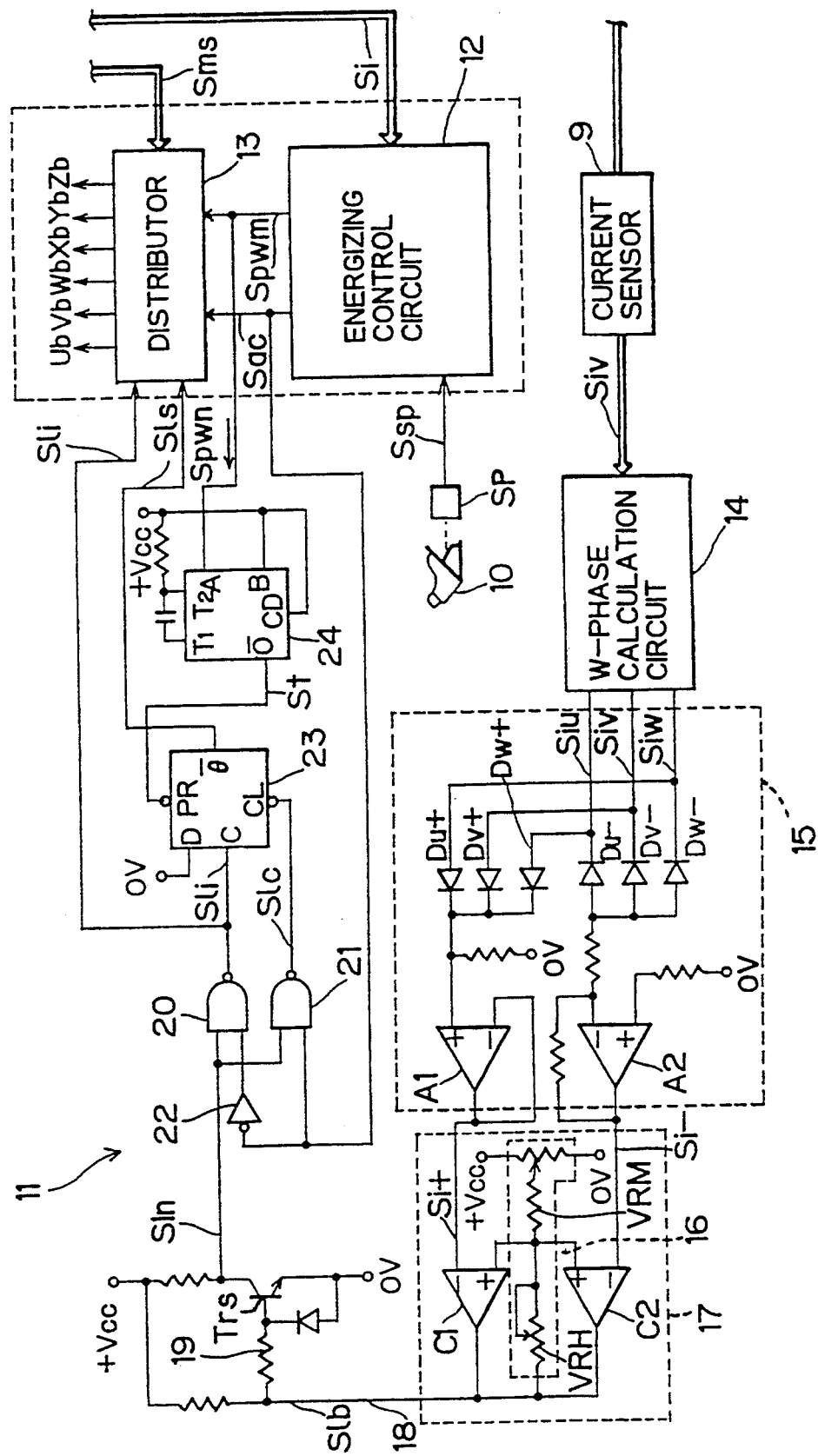
FIG. 3 is an electric circuit diagram showing a control circuit for the invertor according to the embodiment of the present invention.

Referring to the accompanying drawings, a preferred embodiment of the invention will be described while referring to FIGS. 2 through 10. The preferred embodiment is used to drive the motor of a sewing machine. As shown in FIG. 2, the sewing machine includes a d.c. power source 1, an invertor 5, and a three-phase AC motor 6.

The d.c. power source 1 includes a full-wave rectifier 3, which produces a direct current by subjecting a three-phase alternating current from a commercial a.c. power source 2 to full-wave rectification, and a smoothing circuit 4, which smooths the d.c. output from the full-wave rectifier 3.

The invertor 5 receives the d.c. output from the d.c. power source 1 where the d.c. output is inversely converted to variable frequency a.c. power which is then used to energize the phase coils of a motor 6. The invertor 5 includes six (6) transistors Tru, Try, Trw, Trx, Try, and Trz which form a three-phase bridge connection with the three phase coils of the motor 6, that is, a V-phase coil Lv, a U-phase coil Lu, and a W-phase coil Lw. Transistor Tru and transistor Trx are connected to the U-phase coil Lu by junction point Pu. Transistor Trv and transistor Try are connected to V-phase coil Lv by junction point Pv. Transistor Trw and transistor Trz are connected to the W-phase coil Lw by junction point Pw. The transistors Tru, Trv, Trw, Trx, Try, and Trz are connected in parallel with commutation diodes Du, Dv, Dw, Dx, Dy, and Dz respectively.

The motor 6 is provided with an encoder 7 and a magnetic sensor 8. The encoder 7 detects the rotational speed of the motor 6 and outputs a detected speed signal Sj. The magnetic sensor 8 detects the rotational position of a rotor (not shown) of the motor 6 and outputs a rotational position signal Sms. The current sensor 9 detects currents Iu and Iv flowing in the U-phase coil Lu and the V-phase coil Lv respectively and outputs a U-phase and a V-phase current detected current signal Siu and Siv. Although not specifically shown, the current sensor 9 includes a first current sensor for sensing the current Iu flowing in the U-phase coil Lu and a second current sensor for sensing the current Iv flowing in the V-phase coil Lv. The transistors Tru, Trv, Trw, Trx, Try, and Trz are rendered ON and OFF by the control circuit 11 shown in FIG. 3 based on the above mentioned signals and a speed command signal Ssp outputted by a speed command unit Sp as operated by a foot pedal 10. Next, the structure of the control circuit 11 will be explained while referring to FIG. 3.

The speed command signal Ssp from the speed command unit SP and the detected speed signal Sj from the encoder 7 are inputted to an energizing control circuit 12. Based on these signals, the energizing control circuit 12 generates an acceleration/deceleration command signal Sac, which controls acceleration or deceleration, and a PWM signal Spwm and outputs them to a distributor 13. The distributor 13 outputs switching pulses Ub, Vb, Wb, Xb, Yb, and Zb to the respective bases of transistors Tru, Trv, Trw, Trx, Try, and Trz based on the PWM signal Spwm and the acceleration/deceleration command Sac. By selectively rendering the transistors ON and OFF, the output frequency and voltage of the invertor 5 can be controlled in order to drive the three-phase AC motor 6 at variable speeds.

Figure 4:
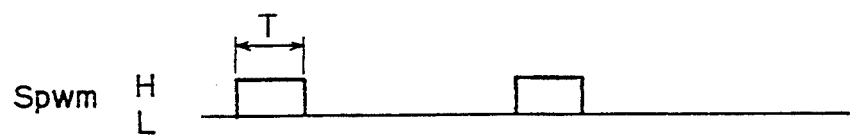
FIGS. 4(a) through 4(d) are waveform diagrams each showing a PWM signal $S_{pwm}$ and an acceleration/deceleration signal $S_{ac}$.
Figure 4:
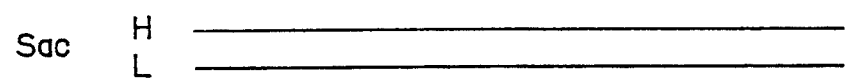
Figure 4:
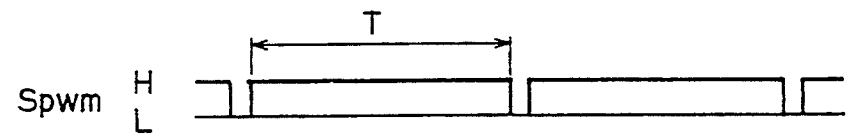
Figure 4:
Figure 5:
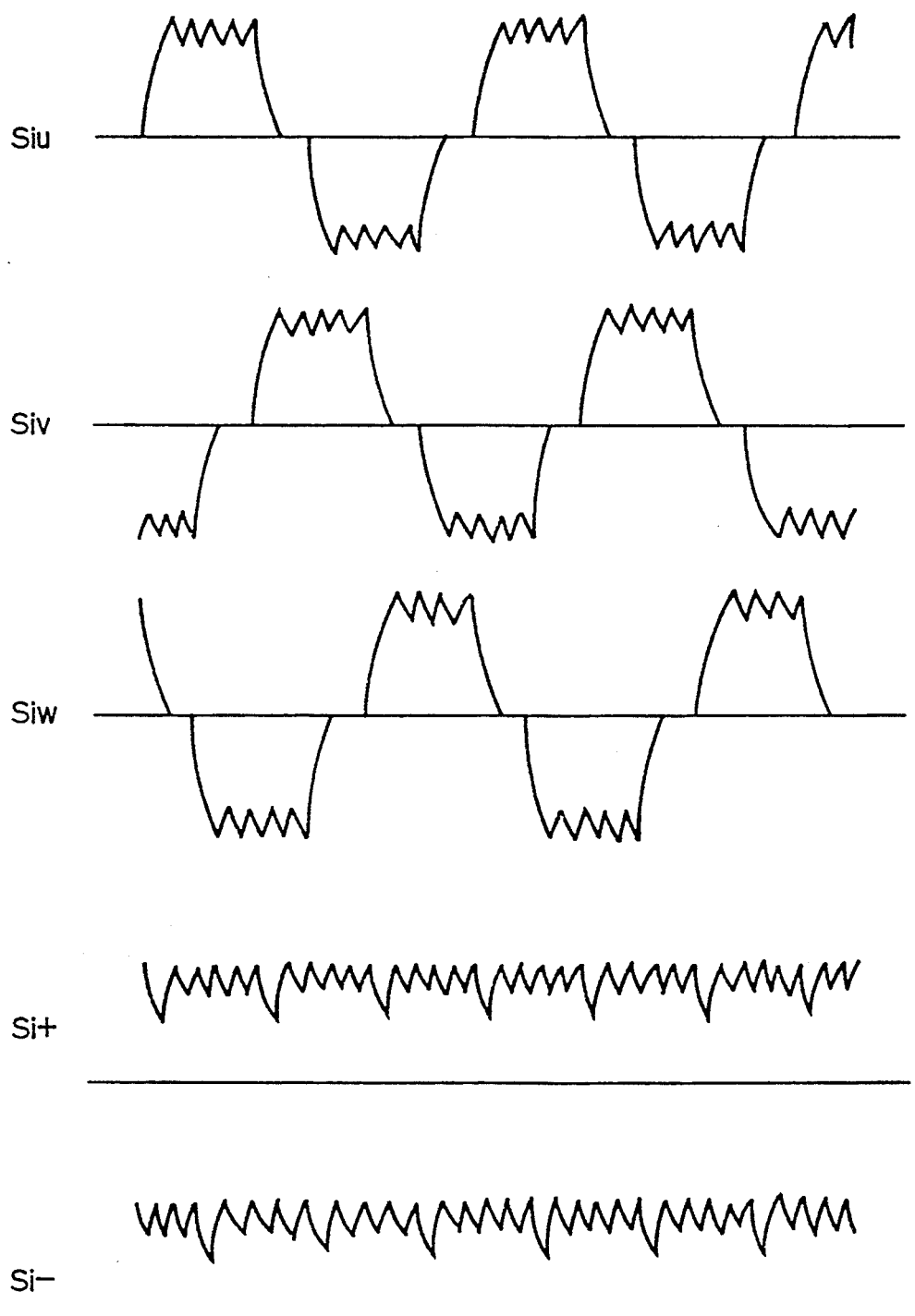
FIG. 5 shows waveform diagrams of various signals appearing in the circuits shown in FIGS. 2 and 3.

When the difference between the speed command signal Ssp and the detected speed signal Sj is small, the pulse width T of the PWM signal Spwm is similarly small as shown in FIGS. 4(a) and 4(c). However, when the difference between these two signals is large, the pulse width T is also large as shown in FIGS. 4(b) and 4(d). Generally, during operation at a fixed rotational speed, the width T of the PWM signal Spwm is small. The acceleration/deceleration signal Sac is at a high level H when the difference between the speed command signal Ssp and the detected speed signal Sj is positive, as shown in FIGS. 4 (a) and 4 (b), and a low level L when the difference is negative, as shown in FIGS. 4 (c) and 4(d).

The U-phase and V-phase detected current signals Siu and Siv outputted from the current sensor 9 (refer to FIG. 5), are inputted to a W-phase current calculation circuit 14. The W-phase current calculation circuit 14 performs hardware processing on these signals to determine the W-phase coil current.

That is, because the sum of the W-phase detected current signal Siw, the U-phase detected current signal Siu, and the V-phase detected current signal Siv equals zero (0), or stated equationally as follows:

$$Siw + Siu + Siv = 0,$$

the value of the W-phase detected current signal Siw can be determined using the following equation:

$$Siw = -(Siu + Siv).$$

Determining the W-phase detected current signal Siw from the U-phase and V-phase detected current signals Siu and Siv reduces the number of expensive current sensors required for the sewing machine and therefore the overall cost thereof.

Based on the above calculations, the W-phase current calculation circuit 14 generates a W-phase detected current signal Siw which it outputs to a current OR gate 15 with the U-phase and V-phase detected output current signals Siu and Siv. The current OR circuit 15 includes diodes Du+, Dv+, Dw+, Du−, Dv−, and Dw−, a first operational amplifier A1, and a second operational amplifier A1. Diodes Du+, Dv+, and Dw+ extract the positive current components from the U-phase, V-phase, and W-phase detected output current signals Siu, Siv, and Siw respectively, and diodes Du−, Dv−, and Dw− extract the negative components. The first operational amplifier A1 outputs a positive signal Si+ (refer to FIG. 5) which is an addition of the positive components of the respective phase current signals. The second operational amplifier A1 outputs a negative current signal Si− (refer to FIG. 5) which is an addition of the negative components of the respective phase current signals.

The positive signal Si+ outputted from the first operational amplifier A1 and the negative signal Si− outputted from the second operational amplifier A2 are outputted to a ripple judgement circuit 17. The ripple judgement circuit 17 includes a first and a second open collector (O/C) type comparator C1 and C2, an allowable current setting circuit 16, and two (2) variable resistors VRM and VRH.

The positive signal Si+ outputted from the first operational amplifier A1 is inputted to the inverting input terminal (−) of the first comparator C1, and the negative signal Si− outputted from the second operational amplifier A2 is inputted into the inverting input terminal (−) of the second comparator C2. The non-inverting input terminals (+) of both the first and second comparators C1 and C2 are connected to the allowable current setting circuit 16 via two (2) variable resistors VRM and VRH. The allowable current setting circuit 16 sets the maximum value Imax and the minimum value Imin of the current from each phase coil per the following equation:

$$Imax = IVRM + \tfrac{1}{2} \times IVRH$$

$$Imin = IVRM - \tfrac{1}{2} \times IVRH$$

The output terminals of both the comparators C1 and C2 are connected to an output signal line 18 of the ripple judgement circuit 17. The output signal line 18 is connected to the base of transistor Trs via a resistor 19. Because both the first and second comparators C1 and C2 are open collector types, the output of the ripple judgement circuit 17 is inverted to the high level, consequently rendering the transistor Trs ON, only when the outputs from the comparators C1 and C2 are both at the high level. When either or both of the comparators C1 and C2 are at the low level, the ripple judgement circuit 17 remains at a low level and the transistor Trs remains OFF.

The collector of transistor Trs is connected to a first input terminal of both first and second NAND gates 20 and 21. When the transistor Trs is rendered ON, it outputs from its collector a current restriction signal which is inputted to the first input terminals of the first and second NAND gates 20 and 21. The output terminal of the energizing control circuit 12 is connected to the second input terminal of the first NAND gate 20 via a NOT gate 22 and directly to the second input terminal of the second NAND gate 21. The acceleration/deceleration signal Sac outputted from the energizing control circuit 12 is inverted at the NOT gate 22 before being inputted to the second terminal of the first NAND gate 20, and inputted directly to the second input terminal of the second NAND gate 21.

The output of the first NAND gate 20 is connected to the distributor 13 and the clock terminal C of a D-type flip-flop 23. The output of the second NAND gate 21 is connected to the clear terminal CL of the flip-flop 23. The flip-flop 23 has three more terminals: a data input terminal D, an output terminal Q-bar, and a preset terminal PR. The data input terminal D is maintained at a zero (0) volt (low level) electric potential, the output terminal Q-bar of the flip-flop 23 is connected to the distributor 13, and the preset terminal PR is connected to an output terminal O-bar of a monostable multivibrator 24.

The output signal Sli from the first NAND gate 20 is inputted to both the distributor 13 and the clock terminal C of the flip,flop 23. The output signal Slc of the second NAND gate 21 is inputted to the clear terminal CL of the flip-flop 23. Each time a high level signal Sli is inputted to the clock terminal C from the first NAND gate 20, the flip-flop 23 reads data (low level signal) from the data input terminal D and outputs a high level signal Sl2 from the output terminal Q-bar to the distributor 13.

In addition to the output terminal O-bar, the monostable multivibrator 24 has an input terminal A. The input terminal A is connected to the energizing control circuit 12 for receiving the PWM signal Spwm outputted therefrom. In response to the rising edge of the PWM signal Spwm, the monostable multivibrator 24 outputs a synchronization signal St (a low level signal) from the output terminal O-bar which in turn is inputted to the preset terminal PR of the flip-flop 23.

The control circuit described above performs controls as described below.

1. General Control for Decelerating the Three-Phase Motor 6

Figure 6:
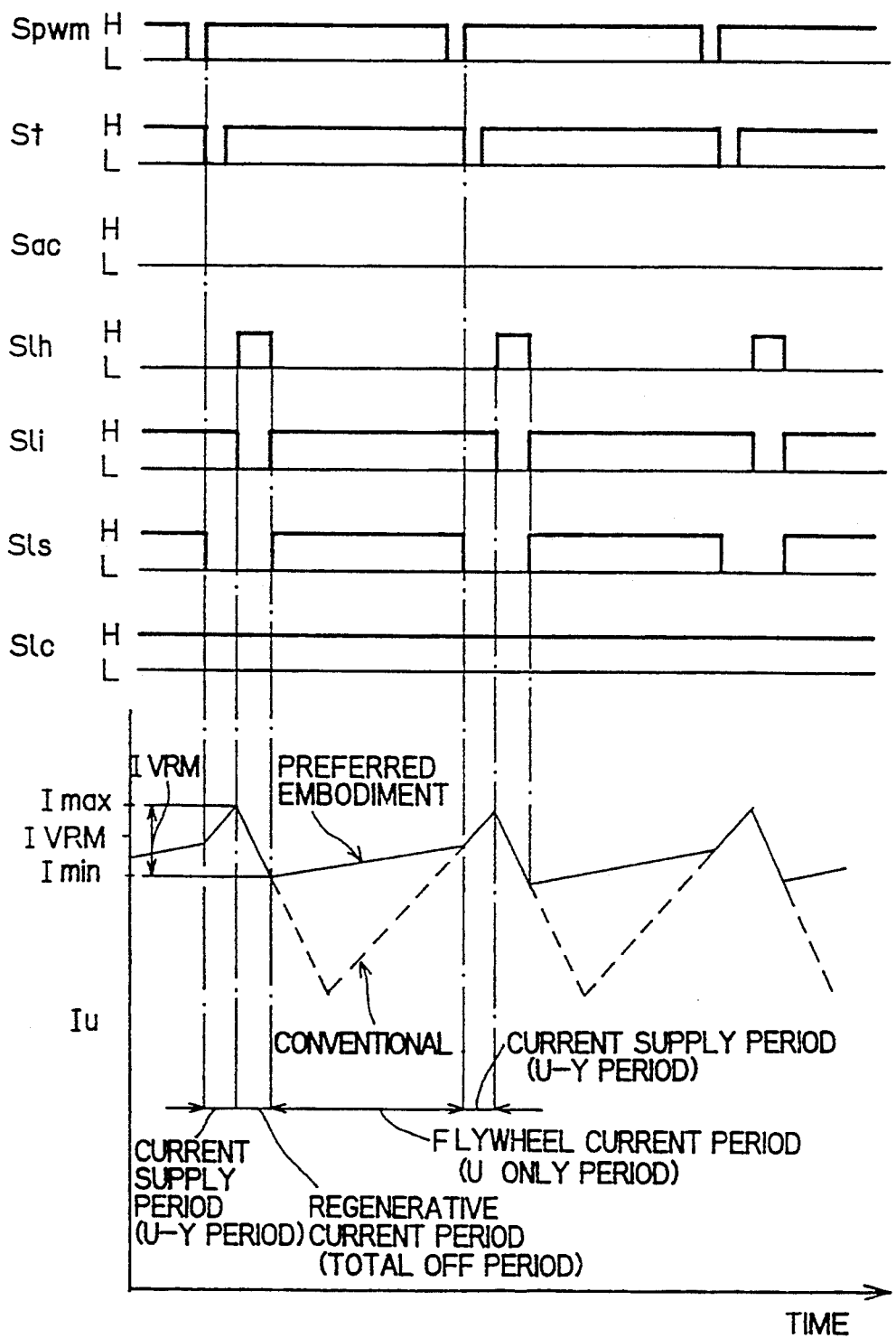
FIG. 6 shows waveform diagrams illustrating relationships between various signals and coil currents flowing at the time of deceleration.

Normally while the three-phase motor 6 is decelerating, the difference between the speed command signal Ssp and the detected speed signal Sj (that is, Ssp−Sj) is a negative value and consequently, as shown in FIG. 6, the acceleration/deceleration signal Sac outputted from the energizing control circuit 12 is maintained at a low level. While an acceleration/deceleration signal Sac that is low level is inputted to one terminal of the second NAND gate 21, the output signal Slc (signal inputted to the clear terminal CL of the flip-flop 23) from the second NAND gate 21 remains at high level. On the other hand, before being inputted to one input terminal of the first NAND gate 20, the acceleration/deceleration signal Sac is inverted to high level at the NOT gate 22.

The current restriction signal Slh inputted to the other input terminal of the first NAND gate 20 from the collector of the transistor Trs is inverted from low level to high level when the current at a coil exceeds the maximum current value Imax (Imax=IVRM+½×IVRH) set at the allowable current setting circuit 16. Conversely, when the current at the coil falls below the minimum current value Imin (Imin=IVRM−½×IVRH), the current restriction signal Slh is inverted from high level to low level. This relationship will be explained while referring to the waveform shown at the lower portion of FIG. 6 which represents current Iu supplied to the U-phase coil.

The period during which current is supplied to the coils of the motor is indicated as the current supply period in FIG. 6. During the current supply period, the transistors Tru and Try of the invertor 5 are rendered ON so that current supplied from the smoothing circuit 4 sequentially flows as indicated by arrows in FIG. 7(a), that is, through transistor Tru, the U-phase coil Lu, the V-phase coil Lv, and transistor Try, so that current Iu gradually increases during the current supply period.

Conversely, when the value of current Iu as determined by the current sensor 9 exceeds the maximum current value Imax (Imax=IVRM+½×IVRH), the output from the comparators C1 and C2 of the ripple judgement circuit 17, and consequently the output signal Slb from the ripple judgement circuit 17, is inverted to low level.

As stated previously, the current OR gate 15 produces a positive current signal Si+ which is an addition of positive current components of the detected current signals Siu, Siv, and Siw and a negative current signal Si− which is an addition of negative current components of the detected current signals Siu, Siv, and Siw. Each signal is then compared with the maximum current value Imax at the comparators C1 and C2. When either the positive current signal Si+ or negative current signal Si− exceeds the maximum value, output from either comparator C1 or C2 is inverted to low level so that the output signal Slb from the ripple judgement circuit 17 becomes low level signal.

The transistor Trs, which has the low level signal Slb applied to its base, is rendered OFF at the time the signal Slb is inverted to low level, and the current restriction signal Slh outputted from the collector of the transistor Trs is rendered high. Consequently, the output signal Sli inputted to the clock terminal C of the flip-flop 23 and to the distributor 13 from the first NAND gate 20 is inverted to low level.

The PWM signal Spwm, outputted from the energizing control circuit 12, is inputted to the input terminal A of the monostable multivibrator 24. In response to the rising edge of the PWM signal Spwm, the monostable multivibrator 24 outputs a low level synchronization signal St from the output terminal O-bar which is input to the preset terminal PR of the flip-flop 23. In synchronization with this, the flip-flop 23 inverts the output signal Sls of the output terminal Q-bar to low level and inputs it to the distributor 13.

Because both signals Sli and Sls inputted to the distributor 13 simultaneously switch to low level, the distributor cuts off switching pulses Ub, Vb, Wb, Xb, Yb, and Zb, thus rendering transistors Tru, Trv, Trw, Trx, Try, and Trz of the invertor circuit 5 OFF. This period in the timing chart shown in FIG. 6 will be referred to as the total OFF period, hereinafter. The three-phase motor 6 operates in a regenerative operation mode during the total OFF period. The regenerative current flows through the U-phase coil Lu and the V-phase coil Lv as indicated by arrows in FIG. 7(b), and returns to the capacitor of the smoothing circuit 4 via the commutation diode Dv. The regenerative current decreases as time elapses as shown at the lower portion of FIG. 6.

The current sensor 9 also detects the regenerative current. When the detected current value including the regenerative current becomes less than the minimum current value Imin (Imin=IVRM−½×IVRH) set at the allowable current setting circuit 16, the output from both comparators C1 and C2 of the ripple judgement circuit 17 is inverted to high level, whereby the output signal Slb of the ripple judgement circuit 17 becomes high level. This renders transistor Trs ON so the current restriction signal Slh outputted from its collector and inputted to the first NAND gate 20 is inverted to low level. Because of this, the output signal Sli from the first NAND circuit 20 inputted to the distributor 13 and the clock terminal of the flip-flop 23 is inverted to high level.

In synchronization with the rising edge of the high level signal Sli inputted to its clock terminal C, the flip-flop 23 reads the data (i.e. the low level signal) from the data input terminal D, and consequently outputs a high level signal Sls from the output terminal Q-bar which is inputted to the distributor 13.

Because the signals Sli and Sls inputted to the distributor 13 are high level simultaneously, the distributor 13 maintains the OFF status of the transistors Trx, Try, and Trz at the lower half of the invertor circuit as per FIG. 2, while selectively rendering ON one of the three transistors at the upper half, i.e. Tru, Trv, or Trw. For example, when the conductive current flows from the U-phase coil Lu to the V-phase coil Lv, transistor Tru only is rendered ON (hereinafter referred to as the U only period). As indicated by arrows in FIG. 7(c), during the U only period the current induced by the U-phase coil Lu and the V-phase coil Lv flows through the commutation diode Dv, the transistor Tru, the U-phase coil Lu, and the V-phase coil Lv as a flywheel current. As indicated at the lower portion of the time chart shown in FIG. 6, the flywheel current gently increases with time.

Conventionally, current supply and regenerative current are only alternately repeated during deceleration. Because the flywheel current is not exploited in conventional motor drives, the rate at which the regenerative current decreases becomes too great, causing current ripple and noise to become great.

On the other hand, when the current value of the regenerative current falls below the predetermined minimum value Imin in a motor drive made according to the preferred embodiment, because the current circulates between the invertor circuit 5 and each phase coil as a flywheel current, the regenerative current decreases at a gentler rate which reduces the current ripple width and noise level.

The flywheel current period (hereinafter referred to as the U only period) is synchronized with the rising edge of the PWM signal Spwm outputted from the energizing control circuit 12, and can be converted to current supply period (U-Y period) as described below. In response to the rising edge of the PWM signal Spwm, the monostable multivibrator 24 outputs from its output terminal O-bar a low level synchronization signal St which is inputted to the preset terminal PR of the flip-flop 23. This causes the signal Sls outputted from the output terminal Q-bar of the flip-flop 23 to the distributor 13 to invert to low level. When the signal Sls is low level and the output signal from the first NAND gate 20 is high level, the distributor 12 switches from a flywheel current period (U only period) to a current supply period (U-Y period). Afterward, the regenerative current period (total OFF period) described above switches to the sequence of the flywheel current period (U only period).

Figure 8:
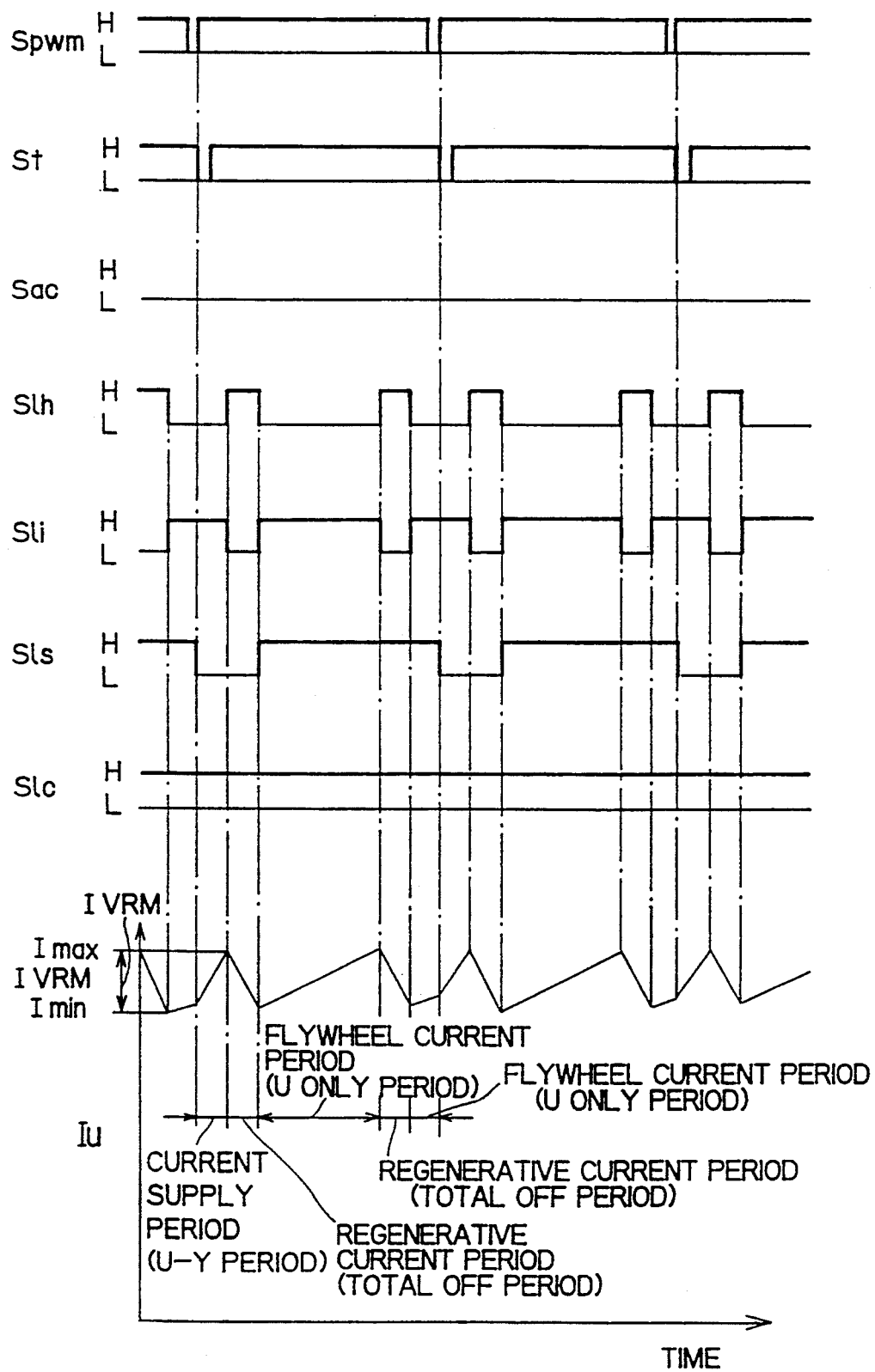
FIG. 8 shows waveform diagrams illustrating relationships between various signals and coil currents flowing at a time when high speed rotations are rapidly decelerated.

2. Control for Rapidly Decelerating the Three-Phase AC Motor 6 from High-Speed Rotation Because, as shown in FIG. 8, the tendency (current increase rate) toward flywheel current period (U only period) increases when decelerating the motor 6 from high-speed rotation, the flywheel current sometimes reaches the maximum current value Imax=IVRM+½ ×IVRH. Assuming that the same control is performed as previously, as shown in FIG. 8, at the instant the flywheel current reaches the maximum current value Imax, all the transistors Tru, Trv, Trw, Trx, Try, and Trz of the invertor circuit 5 are rendered OFF, and there is a subsequent shift to regenerative current period (total OFF period), and thereafter to the sequence for the flywheel current period (U only period) and for the current supply period (U-Y period). The relationship between the input signal Sli and the output signal Sls of the distributor 13 is shown in the following Table 1:

| Sli | Sls | Output |
| --- | --- | --- |
| H | L | Power supply period |
| L | L | Regenerative current period |
| H | H | Flywheel current period |
| L | L | Regenerative current period |

Figure 7:
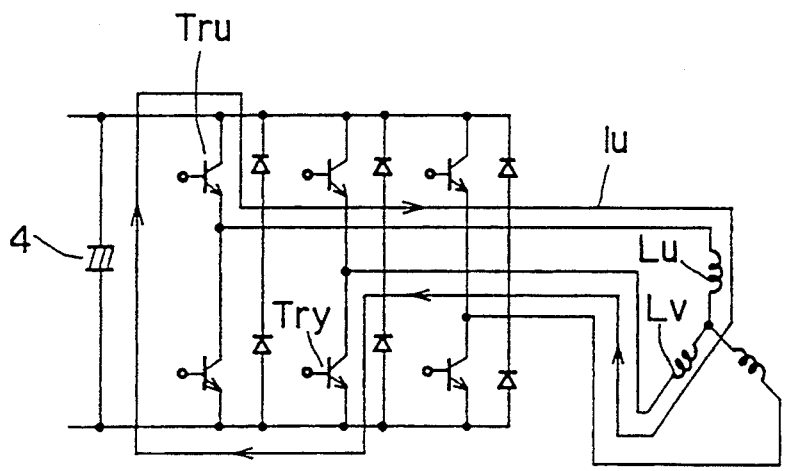
FIGS. 7(a) through 7(c) are circuit diagrams illustrating flows of currents at various periods.
Figure 7:
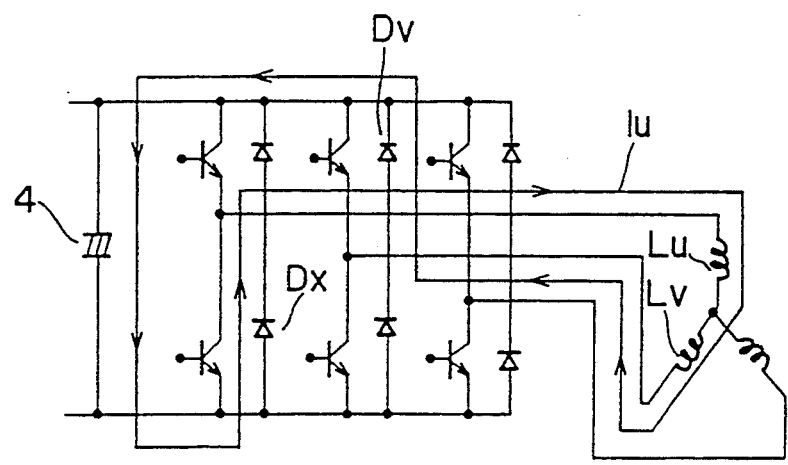
Figure 7:
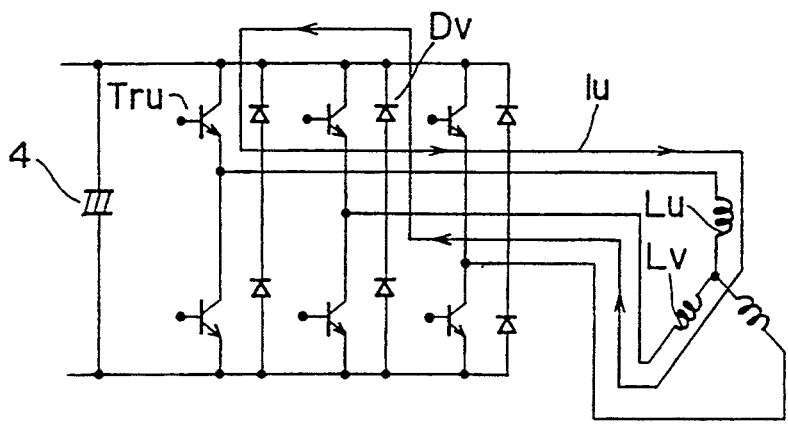

However, by controlling as per FIG. 7 and Table 1, because the switching frequency of transistors Trw, Trv, and Trw doubles that shown in FIG. 6, excessive heat is generated at these transistors requiring the use of expensive high-speed switching elements and other problems.

Figure 9:
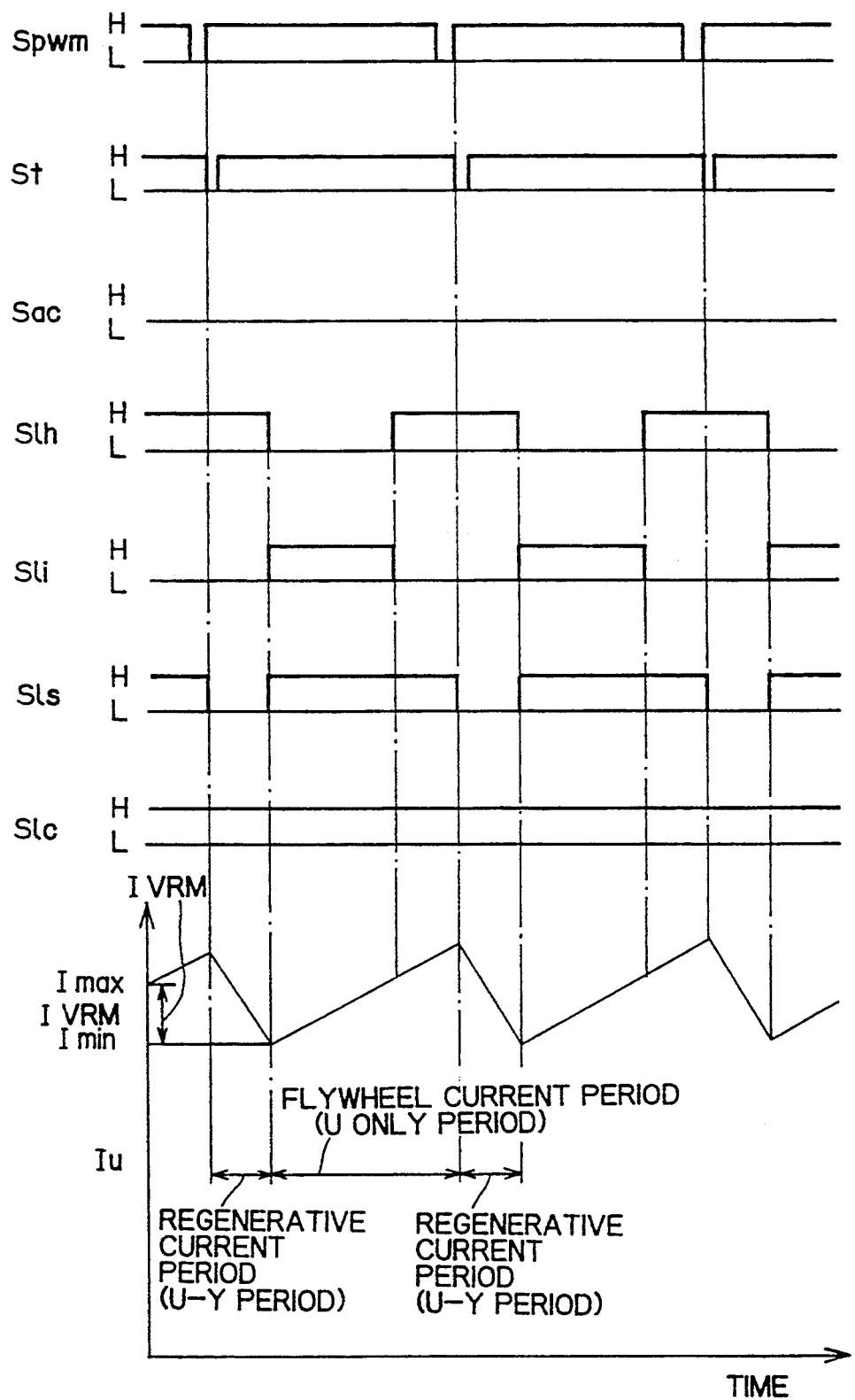
FIG. 9 shows waveform diagrams illustrating best mode relationships between various signals and coil currents flowing at a time when a high speed rotations are rapidly decelerated.

However, as shown in FIG. 9, even if the flywheel current exceeds the maximum current value Imax, the present invention does not shift to the regenerative period (total OFF period), but rather continues flywheel current and shifts to regenerative current period control at the instant that the output signals Sli and Sls of the distributor 13 change to low level. At this instance, the relationship between the output signals Sli and Sls of the distributor 13 is per the following Table 2:

| Sli | Sls | Output |
| --- | --- | --- |
| L | L | Regenerative current period |
| H | H | Flywheel current period |
| L | H | Flywheel current period |

Because the switching frequency of the transistors Tru, Try, Trw, Trx, Try, and Trz is synchronized with the carrier frequency and therefore stabilized, the heat generated at the transistors does not become excessive. In this situation, the flywheel current will temporarily exceed the maximum current value Imax, but tendency toward flywheel current (the current increase rate) is not so large and therefore will not exceed the maximum current value Imax by a great deal.

Even in this case, if the regenerative current (total OFF period) goes below the minimum current value Imin, at that instance, the circuit shifts from the regenerative current (total OFF period) to the flywheel current period (U only period), so therefore the rate at which the current Iu decreases is small compared to conventional motor drives, thus decreasing the current ripple.

3. Controlling Deceleration of the Three-Phase Motor 6

Figure 10:
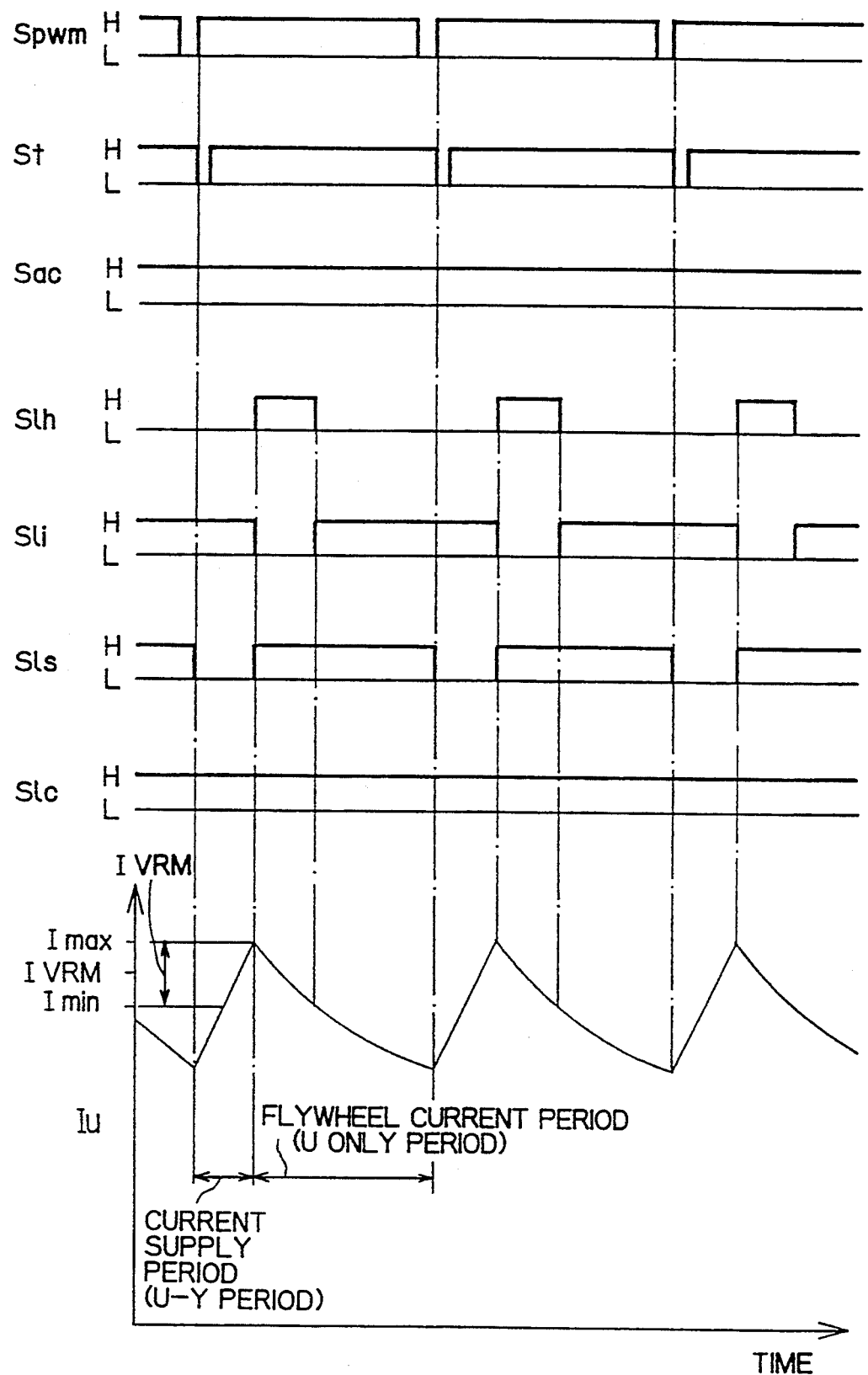
FIG. 10 shows waveform diagrams illustrating relationships between various signals and coil current flowing at a time of acceleration.

To decelerate the three-phase motor 6 normally because the difference between the speed command signal Ssp and the detected speed signal Sj (that is Ssp−Sj) will be positive, the acceleration/deceleration signal Sac outputted from the energize control circuit 12 will be maintained at a high level as shown in FIG. 10. This high level acceleration/deceleration signal Sac is inverted to a low level at the NOT gate 22 and input to the first NAND gate 20. Because of this the signal Sli outputted from the first NAND gate 20 to the distributor 13 is maintained at a high level.

As shown in FIG. 9, in synchronization with the rising edge of the pulse from the PWM signal Spwm (the rising edge of the low level synchronization signal St), the switching action of the transistors Tru, Trv, Trw, Trx, Try, and Trz starts, and current supply to each phase coil Lu, Lv, and Lw starts. Afterwards, at the instant the supply current reaches the maximum current value Imax the input signal Sls of the distributor 13 is inverted to a high level and the operation of the circuit shifts to the flywheel current phase (U only phase). At this flywheel current phase (U only phase) the current value temporarily falls below the minimum current value Imin, but because the signal Sls inputted to the distributor 13 (the signal Q-bar outputted from the flip-flop 23) continues at a high level, the flywheel current continues. In response to the rising edge of the PWM signal Spwm pulse, the signal Sls inputted to the distributor 13 is inverted to a low level, and the operation of the circuit shifts to the current supply phase (U-Y phase). Afterward the above sequence is repeated.

As described above, in the preferred embodiment of the present invention, at the instant that the current value of the regenerative current falls below the minimum current value Imin, the current circulates between the invertor 5 and each phase coil as a flywheel current. Therefore, the rate at which the regenerative current decreases lessens, so that the current ripple and noise greatly decrease.

Because the control circuit 11 required for this noise reduction can be provided to a printed circuit board as a small semiconductor element, space required to fit the circuit are decreased over that required for the large reactor of conventional circuits, which allows a more compact overall unit.

Because there is no need for high frequency carrier waves, expensive high-speed switching elements are also not necessary. A low cost device can thus be achieved.

While the invention has been described in detail with reference to specific embodiments thereof, it would be apparent to those skilled in the art that various changes and modifications may be made therein without departing from the spirit of the invention.

For example, instead of detecting the U-phase and V-phase coil currents with the current sensor 9, and determining the W-phase coil current in the W-phase current calculation circuit 14 using the detected value, the W-phase coil current can be determined by a separate W-phase coil current sensor.

Also, the present invention is not limited to use with a sewing machine motor, but can be used anywhere a reduction in noise is desired.

What is claimed is:

1. A motor drive for driving a motor at a variable speed, the motor having a rotor and a plurality of phase coils, comprising:
   a d.c. power source for supplying a d.c. power;
   an invertor for receiving the d.c. power from said d.c. power source and converting the d.c. power to variable frequency a.c. power, the variable frequency a.c. power being supplied to said plurality of phase coils;
   commuting means connected between said d.c. power source and said plurality of phase coils for allowing commuting currents to flow back to said d.c. power source from said plurality of coils when said rotor is decelerating;
   control means for controlling said invertor so that said rotor rotates at the variable speed with the variable frequency a.c. power supplied by said invertor to said plurality of phase coils, said control means further controlling said invertor so that the commuting currents circulate as flywheel currents between said invertor and said plurality of phase coils when the commuting currents fall below a predetermined level;
   first detecting means for detecting currents flowing in said plurality of phase coils and outputting first detection signals indicative of the currents flowing therein; and
   determining means for determining that the currents flowing in said plurality of phase coils fall below the predetermined level, wherein said control means controls said invertor based on a determination made by said determining means.

2. The motor drive according to claim 1, wherein said motor has first, second and third phase coils and said invertor has a plurality of switching elements for performing on and off switching actions, said plurality of switching elements forming a three-phase bridge connection with said first, second and third phase coils.

3. The motor drive according to claim 2, wherein said first detecting means comprises a first current sensor connected between said invertor and the first phase coil for sensing a current flowing in the first phase coil, a second current sensor connected between said invertor and the second phase coil for sensing a current flowing in the second phase coil, and a current calculation circuit for calculating a current flowing in the third phase coil based on the currents sensed by said first and second current sensors.

4. The motor drive according to claim 3, wherein said current calculation circuit calculates the current flowing in the third phase coil in accordance with an equation given by:

$$Siw = -(Siu + Siv)$$

where Siu is the current flowing in the first phase coil, Siv is the current flowing in the second phase coil, and Siw is the current flowing in the third phase coil.

5. The motor drive according to claim 2, wherein said first detecting means comprises a first current sensor connected between said invertor and the first phase coil for sensing a current flowing in the first phase coil, a second current sensor connected between said invertor and the second phase coil for sensing a current flowing in the second phase coil, and a third current sensor connected between said invertor and the third phase coil for sensing a current flowing in the third phase coil.

6. The motor drive according to claim 2, wherein said commuting means includes a plurality of commutation diodes connected in one-to-one correspondence and in parallel to said plurality of switching elements.

7. The motor drive according to claim 2, further comprising speed command means which issues a speed command signal indicative of a desired rotational speed of said motor, and wherein said control means controls said plurality of switching elements to perform on and off switching actions based further on the speed command signal.

8. The motor drive according to claim 2, further comprising second detecting means for detecting a rotational speed of the motor and outputting a second detection signal indicative of the rotational speed thereof, and wherein said control means controls said plurality of switching elements to perform on and off switching actions based further on the second detection signal.

9. The motor drive according to claim 2, further comprising third detecting means for detecting a rotational position of the rotor and outputting a third detection signal indicative of the rotational position of the rotor, and wherein said control means controls said plurality of switching elements to perform on and off switching actions based further on the third detection signal.

10. The motor drive according to claim 2, further comprising speed command means which issues a speed command signal indicative of a desired rotational speed of said motor, second detecting means for detecting a rotational speed of the motor and outputting a second detection signal indicative of the rotational speed thereof, and third detecting means for detecting a rotational position of the rotor and outputting a third detection signal indicative of the rotational position of the rotor, and wherein said control means controls said plurality of switching elements to perform on and off switching actions based further on the speed command signal, the second detection signal and the third detection signal.

11. The motor drive according to claim 1, further comprising current addition means connected between said first detecting means and said determining means for adding the first detection signals and outputting an added signal to said determining means.

12. The motor drive according to claim 11, wherein said current addition means comprises a first addition circuit for extracting positive components of the first detection signals and adding the extracted positive components, and a second addition circuit for extracting negative components of the first detection signals and adding the extracted negative components.

13. The motor drive according to claim 1, wherein said d.c. power source comprises a full-wave rectifier having an input connected to a commercial a.c. power source which supplies a three-phase alternating current thereto and an output from which a direct current is produced by subjecting the three-phase alternating current to full-wave rectification, and a smoothing circuit connected to the output of said full-wave rectifier, for smoothing the direct current from said full-wave rectifier.

14. A motor drive for driving a motor at a variable speed, the motor having a rotor and a plurality of phase coils, comprising:

a d.c. power source for supplying a d.c. power;

an invertor for receiving the d.c. power from said d.c. power source and converting the d.c. power to variable frequency a.c. power, the variable frequency a.c. power being supplied to said plurality of phase coils;

commuting means connected between said d.c. power source and said plurality of phase coils for providing current paths from said plurality of phase coils to said d.c. power source; and control means for controlling said invertor so that said rotor rotates at the variable speed with the variable frequency a.c. power supplied by said invertor to said plurality of phase coils, said control means further controlling said invertor so that regenerative currents generated from said plurality of phase coils when said rotor is decelerating flow back as commuting currents to said d.c. power source through said commuting means when the regenerative currents are above a predetermined level and that the regenerative currents circulate as flywheel currents between said invertor and said plurality of phase coils when the regenerative currents fall below the predetermined level.

15. The motor drive according to claim 14, further comprising detecting means for detecting the regenerative currents flowing in said plurality of phase coils and outputting detection signals indicative of the regenerative currents flowing therein, and determining means for determining that the regenerative currents flowing in said plurality of phase coils fall below the predetermined level, and wherein said control means controls said invertor based on a determination made by said determining means.

16. The motor drive according to claim 15, wherein said motor has a first phase coil, a second phase coil and a third phase coil, and wherein said detecting means comprises a first current sensor connected between said invertor and said first phase coil for sensing a current flowing in said first phase coil, a second current sensor connected between said invertor and said second phase coil for sensing a current flowing in said second phase coil, and a current calculation circuit for calculating a current flowing in said third phase coil based on the currents sensed by said first and second current sensors.

17. The motor drive according to claim 16, wherein said current calculation circuit calculates the current flowing in said third phase coil in accordance with an equation given by:

$$Siw = -(Siu + Siv)$$

where Siu is the current flowing in said first phase coil, Siv is the current flowing in said second phase coil, and Siw is the current flowing in said third phase coil.

18. The motor drive according to claim 15, further comprising current addition means connected between said detecting means and said determining means for adding the detection signals and outputting an added signal to said determining means.

19. The motor drive according to claim 18, wherein said current addition means comprises a first addition circuit for extracting positive components of the detection signals and adding the extracted positive components, and a second addition circuit for extracting negative components of the detection signals and adding the extracted negative components.

* * * * *